US012625923B2

(12) United States Patent　　　　(10) Patent No.:　US 12,625,923 B2
Hsu et al.　　　　　　　　　　　　(45) Date of Patent:　May 12, 2026

(54) SYSTEM AND METHOD FOR ADJUSTING INPUT DATA OF NEURAL NETWORK

(71) Applicant: VIA Technologies, Inc., Taipei (TW)

(72) Inventors: Jia-yo Hsu, Taipei (TW); I-Chih Chen, Taipei (TW)

(73) Assignee: VIA TECHNOLOGIES, INC., Taipei (TW)

( * ) Notice: Subject to any disclaimer, the term of this patent is extended or adjusted under 35 U.S.C. 154(b) by 1255 days.

(21) Appl. No.: 17/213,293

(22) Filed: Mar. 26, 2021

(65) Prior Publication Data

US 2022/0164605 A1　May 26, 2022

(30) Foreign Application Priority Data

Nov. 23, 2020　(TW) ................................. 109140945

(51) Int. Cl.
*G06N 3/08*　　　(2023.01)
*G06F 18/21*　　(2023.01)
*G06F 18/22*　　(2023.01)
*G06F 18/25*　　(2023.01)

(52) U.S. Cl.
CPC .......... *G06F 18/2163* (2023.01); *G06F 18/22* (2023.01); *G06F 18/251* (2023.01); *G06N 3/08* (2013.01)

(58) Field of Classification Search
CPC .... G06F 18/2163; G06F 18/22; G06F 18/251; G06N 3/08; G06N 3/045; G06V 10/451; G06V 10/50; G06V 10/82; G06T 7/10
See application file for complete search history.

(56) References Cited

U.S. PATENT DOCUMENTS

2002/0029232 A1 *　3/2002　Bobrow ............... G06V 30/418
　　　　　　　　　　　　　　　　　　　　　514/534
2018/0260628 A1 *　9/2018　Namiki ............... G06F 18/2413
2021/0056386 A1 *　2/2021　Murugesan ............ G06Q 50/08
　　　　　　　(Continued)

OTHER PUBLICATIONS

Marmanis et al., "Classification with an edge: Improving semantic image segmentation with boundary detection", Jan. 2018, ISPRS Journal of Photogrammetry and Remote Sensing, vol. 135, pp. 158-172 (Year: 2018).*

(Continued)

*Primary Examiner* — Van C Mang
(74) *Attorney, Agent, or Firm* — McClure, Qualey & Rodack, LLP

(57)　　　　　　ABSTRACT

A system and method for adjusting input data of a decision-making neural network is provided, wherein the system includes a data-dividing neural network apparatus and a data processing apparatus. The data-dividing neural network apparatus receives an input data and divides the input data into a plurality of sub data including a first sub data and a second sub data. The data processing apparatus is coupled to the data-dividing neural network apparatus to receive the sub data, and process the first sub data and the second sub data by different ways when the sub data is processed, so that the first sub data and the second sub data are differently adjusted. The decision-making neural network is electrically coupled to the data processing apparatus to take the processed sub data as input data. As a result, the neural network can change the final output results.

18 Claims, 4 Drawing Sheets

(56)                    References Cited

U.S. PATENT DOCUMENTS

2021/0319098 A1* 10/2021 Pogorelik ............. G06F 21/554

OTHER PUBLICATIONS

Liu et al., "Recent progress in semantic image segmenation", Jun. 27, 2018, Artificial Intelligence Review, vol. 52, pp. 1098-1106 (Year: 2018).*
Li et al., "Interactive Image Segmentation with Latent Diversity", 2018, Proceedings of the IEEE Conference on Computer Vision and Pattern Recognition, pp. 577-585 (Year: 2018).*
Dolz et al., "Deep CNN ensembles and suggestive annotations for infant brain MRI segmentation", Jan. 2020, Computerized Medical Imaging and Graphics, vol. 79, pp. 1-12 (Year: 2020).*

* cited by examiner

SYSTEM AND METHOD FOR ADJUSTING INPUT DATA OF NEURAL NETWORK

CROSS-REFERENCE TO RELATED APPLICATIONS

This application claims the priority benefit of Taiwan application serial no. 109140945, filed on Nov. 23, 2020. The entirety of the above-mentioned patent application is hereby incorporated by reference herein and made a part of this specification.

TECHNICAL FIELD

The present disclosure relates to a system for assisting a neural network, in particular to a system and method for adjusting input data of a neural network.

BACKGROUND

Neural network is a computer application that performs calculations by connections of a large number of artificial neurons. In most cases, the neural network can gradually change the internal structure based on external information, therefore to some extent having a learning function. After the neural network is built, trainings thereof can be performed by accumulating external information, and the structure of itself can be improved gradually; after the training is completed, determined results of substantial accuracy can be provided.

When a neural network can provide determined results of substantial accuracy, it means that for same external input condition, only same results are provided by the same neural network. From another point of view, if the neural network is required to generate other results for the same external input condition, then the neural network must be trained for this goal. However, each time of the process of self-training by accumulating external information costs a lot of time. Therefore, when facing an operating procedure where the determining conditions may change frequently, it may not be worthy to introduce a neural network.

For example, assuming that for packaging seals of a product A, to meet a requirement, only a gap smaller than 1 mm between adjacent seals is required, while for packaging seals of a product B, to meet a requirement, a gap smaller than 0.5 mm between adjacent seals is required, then a computer vision neural network for checking the packaging seals of product A cannot be shared as a computer vision neural network for checking the packaging seals of product B. In this situation, by technologies in prior art, the problem can only be solved by establishing two sets of computer vision neural networks corresponding to the seal checks of the two different products respectively. Once other products with different requirements on the packaging seals appear, the problem can only be solved by increasing the number of computer vision neural networks or re-training the computer vision neural networks that are no longer in use.

Therefore, although a neural network can provide accurate determined results, since only accurate determined results can be provided, a neural network may not be suitable for solving problems in some special environments.

SUMMARY

In view of this, the description of the present disclosure provides a system and a method for adjusting the input data of a neural network, wherein the neural network is caused to change the final output results by changing the contents of data that was to be input to the neural network.

In one aspect, the present disclosure provides a system for adjusting input data of a neural network; the system is adapted to adjust input data which is to be input to a decision-making neural network and includes a data-dividing neural network apparatus and a data processing apparatus. The data-dividing neural network apparatus is configured to receive the input data and divide the input data into a plurality of sub data including a first sub data and a second sub data; the data processing apparatus is coupled to the data-dividing neural network apparatus to receive each sub data, and configured to process the first sub data and the second sub data by different ways, so that the first sub data and the second sub data are differently adjusted, and combine the first adjusted sub data and the second adjusted sub data as modified input data; wherein the decision-making neural network is coupled to the data processing apparatus to take the modified input data as the input data. The decision-making neural network is configured to determine a result based on a relationship between the first sub data and the second sub data which may have been changed by the data processing apparatus.

In one embodiment, the input data is an image.

In one embodiment, each sub data is a partial image of the image; after the first sub data and the second sub data are processed by the data processing apparatus, a distance between a first partial image represented by the first sub data and a second partial image represented by the second sub data is changed. Further, the decision-making neural network is configured to determine the result according to the distance between the first partial image and the second partial image.

In another embodiment, the data processing apparatus is configured to change the relationship between the first sub data and the second sub data by different degrees to combine the first adjusted sub data and the second adjusted sub data into a plurality of different modified input data respectively; wherein these different modified input data are respectively input to a plurality of decision-making neural networks to generate a plurality of different results. Each of these decision-making neural networks is configured to determine the result according to the relationship between the first sub data and the second sub data changed in a corresponding modified input data.

In one embodiment, the first partial image represented by the first sub data and the second partial image represented by the second sub data do not overlap with each other.

In one embodiment, the data-dividing neural network apparatus is configured to generate the plurality of sub data by dividing the input data with a semantic analysis neural network.

In one embodiment, the decision-making neural network is configured to firstly receive the input data as the input to generate the result. If the result does not comply with a standard, the system is configured to receive the same input data to generate the modified input data, and the decision-making neural network is then configured to receive the modified input data as the input to re-generate a result.

In one embodiment, the data processing apparatus is configured to decide the relationship, to be changed, between the first sub data and the second sub data according to the result generated by inputting the input data to the decision-making neural network.

In another aspect, the present disclosure provides a method for adjusting input data of a neural network; the method is for adjusting input data which is to be input to a decision-making neural network for generating a result. The method includes: receiving the input data; dividing the input data into a plurality of sub data including a first sub data and a second sub data; processing the first sub data and the second sub data by different ways, so that the first sub data and the second sub data are differently adjusted for changing a relationship between the first sub data and the second sub data; combining the first adjusted sub data and the second adjusted sub data as modified input data; and inputting the modified input data to the decision-making neural network; wherein the decision-making neural network determines the result based on the relationship between the first sub data and the second sub data.

In one embodiment, the input data is an image.

In one embodiment, each sub data is a partial image of the image; after the first sub data and the second sub data are processed by different ways, a distance between a first partial image represented by the first sub data and a second partial image represented by the second sub data is changed. Further, the decision-making neural network determines the result according to the distance between the first partial image and the second partial image.

In one embodiment, processing the first sub data and the second sub data by different ways comprises changing the relationship of the first sub data and the second sub data by different degrees to combine the first adjusted sub data and the second adjusted sub data into a plurality of different modified input data respectively; wherein these different modified input data are respectively input to a plurality of decision-making neural networks to generate a plurality of different results. Each of the plurality of decision-making neural networks determines the result according to the relationship between the first sub data and the second sub data changed in a corresponding modified input data.

In one embodiment, the first partial image represented by the first sub data and the second partial image represented by the second sub data do not overlap with each other.

In one embodiment, dividing the input data into a plurality of sub data including a first sub data and a second sub data comprises dividing the input data with a semantic analysis neural network to generate the aforementioned sub data.

In one embodiment, before processing the first sub data and the second sub data by different ways so that the first sub data and the second sub data are differently adjusted for changing a relationship between the first sub data and the second sub data, the method further includes: inputting the input data to the decision-making neural network to generate the result; if the generated result does not comply with the standard, performing the step of processing the first sub data and the second sub data by different ways so that the first sub data and the second sub data are differently adjusted for changing a relationship between the first sub data and the second sub data and the subsequent steps.

By this, the present disclosure is able to change the data that would be provided to the decision-making neural network. Before providing the input data to the decision-making neural network, the system provided by the present disclosure may first divide the input data into a plurality of sub data and change the relationships between multiple sub data therefrom. The sub data whose relationships have been changed will be further input to the decision-making neural network. Therefore, after the aforementioned processing, the input data provided to the decision-making neural network has been changed, and the decision-making neural network generates results based on the changed input data. Therefore, the goal of changing the output result of the decision-making neural network finally may be achieved with appropriate adjustments on the parameters of the data processing apparatus only. Since the time required to adjust the parameters of the data processing apparatus is obviously shorter than the time required to re-train the neural network, the solution provided by the present disclosure can reduce the time cost required to use the neural network in some special environments.

Figure 1:
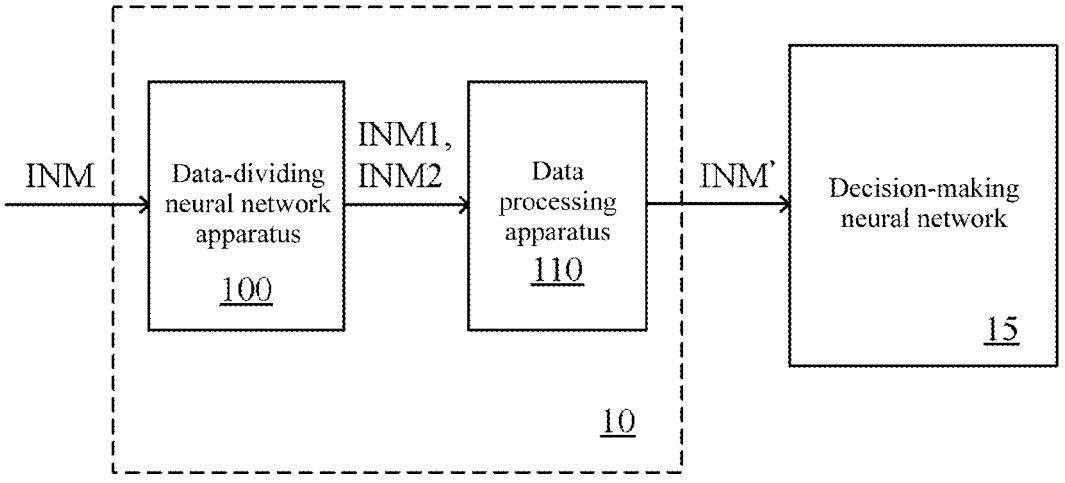
FIG. 1 is a circuit block diagram of a system for adjusting input data of a neural network according to an embodiment of the present disclosure.

The numerical references in the drawings are briefly illustrated as below.

10: system for adjusting input data of a neural network; 15: decision-making neural network; 100: data-dividing neural network apparatus; 110: data processing apparatus; 300: image; B1, B2, B3: sub blocks; d1, d2: distances; INM: input data; INM1: first sub data; INM2: second sub data; INM': modified input data; $P_1$-$P_9$, $Q_1$-$Q_{12}$, $R_1$-$R_{18}$: positions; S1, S2, S3: line segments; S200-S206: steps to be performed according to an embodiment of the present disclosure.

DETAILED DESCRIPTION

Referring to FIG. 1, FIG. 1 is a circuit block diagram of a system for adjusting input data of a neural network according to an embodiment of the present invention. As shown in FIG. 1, the system for adjusting the input data of the neural network (hereinafter referred to simple as "the system") 10 includes a data-dividing neural network apparatus 100 and a data processing apparatus 110, wherein the data-dividing neural network apparatus 100 receives the input data INM that was meant to be input to the decision-making neural network 15, and the modified input data INM' output by the data processing apparatus 110 are provided to the decision-making neural network 15 as data replacing the input data INM. Finally, the decision-making neural network 15 generates the final result of decision according to the received modified input data INM'. In an embodiment, the data-dividing neural network apparatus 100 and the data processing apparatus 110 may each include a processor to execute corresponding program codes to realize their respective functions. In another embodiment, the program codes corresponding to the data-dividing neural network apparatus 100 and the data processing apparatus 110 respectively may be executed by a processor included in the system 10 to realize their respective functions. In an embodiment, the decision-making neural network 15 may be a convolutional neural network Xception, but those skilled in the art may know that there are various convolutional neural networks that may implement the decision-making neural network, and the present disclosure is not limited to this.

5

Figure 2:
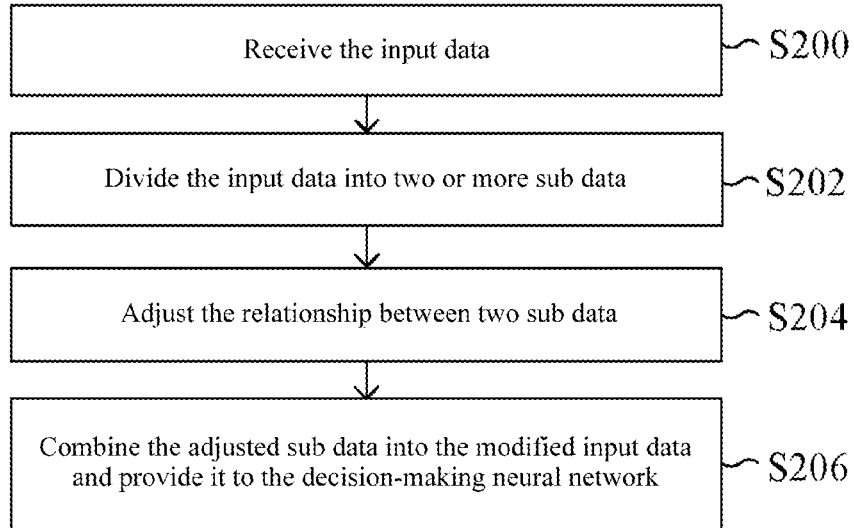
FIG. 2 is an operational flowchart of a system for adjusting input data of a neural network according to an embodiment of the present disclosure.

Referring to FIGS. 1 and 2, FIG. 2 is an operational flowchart of a system for adjusting input data of a neural network according to an embodiment of the present disclosure. In the present embodiment, the data-dividing neural network apparatus 100 first receives the input data INM that was meant to be provided to the decision-making neural network 15 (step S200). The input data INM may be data of any dimension, such as data composed of a sequence of text or data composed of an image. The following description is given with an image serving as the input data INM, but the actual implementation is not limited to this.

Figure 3:
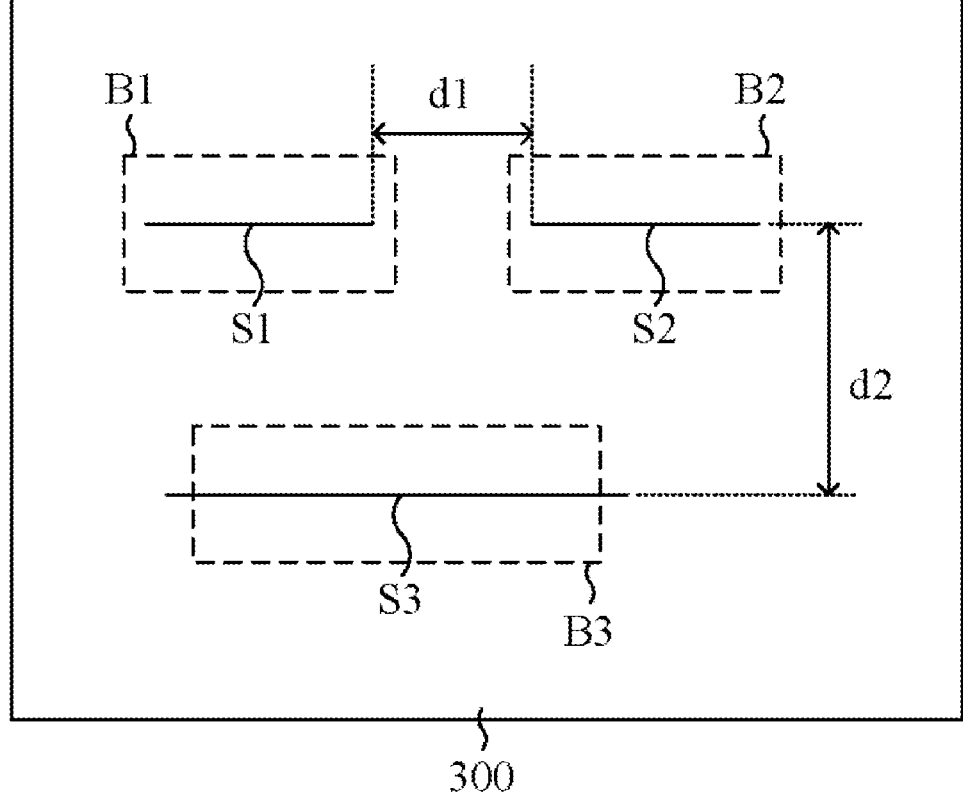
FIG. 3 is a diagram of the input data according to an embodiment of the present disclosure.

Referring to FIG. 3, FIG. 3 is a diagram of the input data according to an embodiment of the present disclosure. In the present embodiment, the image 300 is the input data (equivalent to the aforementioned input data INM) that would be provided to the decision-making neural network 15, and includes a line segment S1, a line segment S2 and a line segment S3. In the image 300, the distance between the line segment S1 and the line segment S2 is d1, and the distance between the line segment S1 and the line segment S3 or that between the line segment S2 and the line segment S3 is d2. After the data-dividing neural network apparatus 100 receives the image 300 by step S200, the data-dividing neural network apparatus 100 extracts the features of the image 300 and performs the division according to the neural network model trained in advance. It should be noted that the data-dividing neural network apparatus 100 should be trained to divide the image 300 based on the decision from the decision-making neural network 15. For example, when the decision-making neural network 15 determines the result of decision according to the distance between the line segment S1 and the line segment S2, the data-dividing neural network apparatus 100 should be able to get a sub block B1 containing the line segment S1 and a sub block B2 containing the line segment S2 by dividing the image 300; when the decision-making neural network 15 determines the result of decision according to the distance between the line segment S1 and the line segment S3, the data-dividing neural network apparatus 100 should be able to get the sub block B1 containing the line segment S1 and a sub block B3 containing the line segment S3 by dividing the image 300. On the whole, the data-dividing neural network apparatus 100 divides the image 300 and the data matrix (i.e., the pixel matrix) behind it according to the objects (line segment S1 and line segment S2 or line segment S1 and line segment S3 in the above examples) used for the decision by the decision-making neural network 15. In different actual applications, the data-dividing neural network apparatus 100 may use various methods, such as using semantic analysis neural networks, to identify the above-mentioned sub blocks, for training and improving its ability to divide the image correctly. In an embodiment, the data-dividing neural network apparatus 100 may be implemented as a convolutional neural network U-Net, which may be trained to perform semantic analysis according to the rules for determining the result of decision by the decision-making neural network 15, so as to divide the image 300 appropriately; but the present invention is not limited to this. Those skilled in the art should know that the semantic analysis may be implemented by a variety of existing convolutional neural networks, which will not be repeated here.

While getting the sub blocks B1, B2 or B3 by division, the data-dividing neural network apparatus 100 may also divide the corresponding data contents of the sub blocks B1, B2 or B3 in the input data INM into respective sub data. In an embodiment, the data-dividing neural network apparatus 100 obtains the sub data from division by establishing a

Figure 4:
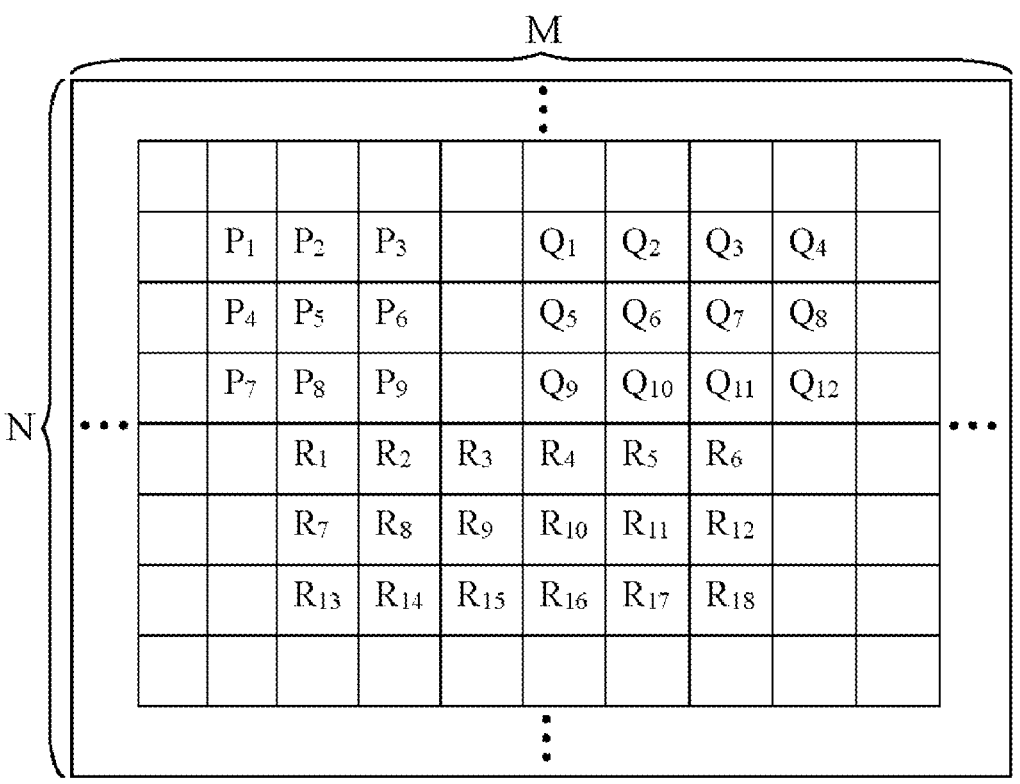
FIG. 4 is a diagram of the input data according to an embodiment of the present disclosure.

6 corresponding mask. Referring to FIG. 4, assuming that the original input data INM is an N*M data matrix (for example, an image with a resolution of N*M), the corresponding data content of the sub block B1 in the input data INM is located at the positions denoted as $P_1$-$P_9$ (such as the pixel positions in the image) in FIG. 4, the corresponding data content of the sub block B2 in the input data INM is located at the positions denoted as $Q_1$-$Q_{12}$ in FIG. 4, and the corresponding data content of the sub block B3 is in the input data INM is located at the positions denoted as $R_1$-$R_{18}$ in FIG. 4. In this situation, the data-dividing neural network apparatus 100 may establish three masks each with a size of N*M. One of the three masks (hereinafter referred to as the first mask) sets the values of the positions denoted as $P_1$-$P_9$ in FIG. 4 to 1, and sets the values of the other positions to 0; another mask (hereinafter referred to as the second mask) sets the values of the positions denoted as $Q_1$-$Q_{12}$ in FIG. 4 to 1, and sets the values of other positions to 0; and the last mask (hereinafter referred to as the third mask) sets the values of the positions denoted as $R_1$-$R_{18}$ in FIG. 4 to 1, and sets the values of other positions to 0.

Subsequently, the data-dividing neural network apparatus 100 may perform an AND operation on the input data INM with the three masks respectively to generate the corresponding sub data. That is, the data-dividing neural network apparatus 100 performs an "AND" operation on the input data INM with the first mask to generate a corresponding sub data which has a content where the values of the positions denoted as $P_1$-$P_9$ in FIG. 4 remain unchanged while the values of the other positions are changed to 0 due to the first mask; similarly, the data-dividing neural network apparatus 100 performs an "AND" operation on the input data INM with the second mask to generate a corresponding sub data which has a content where the values of the positions denoted as $Q_1$-$Q_{12}$ in FIG. 4 remain unchanged while the values of the other positions are changed to 0 due to the second mask; and the data-dividing neural network apparatus 100 performs an "AND" operation on the input data INM with the third mask to generate a corresponding sub data which has a content where the values of the positions denoted as $R_1$-$R_{18}$ in FIG. 4 remain unchanged while the values of the other positions are changed to 0 due to the third mask.

It should be noted that when the decision-making neural network 15 determines the result of decision according to the relationship between the line segment S1 and the line segment S2, the data-dividing neural network apparatus 100 may only need to get the sub block B1 containing the line segment S1 and the sub block B2 containing the line segment S2 by division, and only the first mask and the second mask need to be generated for obtaining two corresponding sub data from operations. Similarly, when the decision-making neural network 15 determines a result of decision according to the relationship between the line segment S1 and the line segment S3, the data-dividing neural network apparatus 100 only needs to get the sub block B1 containing the line segment S1 and the sub block B3 containing the line segment S3 by division, and only the first mask and the third mask need to be generated for obtaining two corresponding sub data from operations. Only when the decision-making neural network 15 determines a result of decision according to the relationships among the line segment S1, the line segment S2, and the line segment S3, the data-dividing neural network apparatus 100 has to generate the first, second, and third masks for obtaining three corresponding sub data from operations.

The following description assumes that the decision-making neural network 15 generate a result of decision according to the relationship between line segment S1 and line segment S2, but those skilled in the art should know that the relevant content may also be extended to cases where the result of decision is generated according to the relationship between line segment S1 and line segment S3 or according to the relationships among the line segment S1, the line segment S2, and the line segment S3.

Referring back to FIGS. 1 and 2, when the decision-making neural network 15 generates a result of decision according to the relationship between the line segment S1 and the line segment S2, the data-dividing neural network apparatus 100 gets the sub block B1 and the sub block B2 by dividing the image 300 after receiving the image 300 (step S200), and further obtains the corresponding masks and corresponding sub data (step S202). The sub data INM1 corresponding to the sub block B1 (hereinafter referred to as the first sub data) and the sub data INM2 corresponding to the sub block B2 (hereinafter referred to as the second sub data) will be transmitted to the data processing apparatus 110 in any possible form; for example, the first sub data INM1 and the second sub data INM2 may be transmitted separately, or new data formed by an "OR" operation on the first sub data INM1 and the second sub data INM2 may be transmitted.

After receiving the first sub data INM1 and the second sub data INM2, the data processing apparatus 110 starts to process the first sub data INM1 and the second sub data INM2 respectively. It should be noted that the data processing by the data processing apparatus 110 on the first sub data INM1 and the second sub data INM2 should be related to a relationship according to which the decision-making neural network 15 generates a result of decision. For example, when the decision-making neural network 15 generates the result of decision according to the distance between the first sub data INM1 and the second sub data INM2 (that is, the distance d1 between the line segment S1 and the line segment S2 on the image 300), the data processing to be performed by the data processing apparatus 110 may include: moving the positions of the non-zero data of the first sub data INM1, moving the positions of the non-zero data of the second sub data INM2, or moving the positions of the non-zero data of both the first sub data INM1 and the second sub data INM2 simultaneously, so as to change the value of the distance d1. In another example, when the decision-making neural network 15 generates the result of decision according to a difference in brightness between the first sub data INM1 and the second sub data INM2, the processing to be performed by the data processing apparatus 110 may include: changing the values of the non-zero data of the first sub data INM1, changing the values of the non-zero data of the second sub data INM2, or changing the values of the non-zero data of both the first sub data INM1 and the second sub data INM2 simultaneously, so as to change the difference in brightness between the first sub data INM1 and the second sub data INM2. In an embodiment, the result of decision generated by the decision-making neural network 15 may be one of a plurality of possible results, where the plurality of possible results may be generated according to at least one relationship among the sub data, or may be irrelative to the relationships among the sub data. For example, the plurality of possible results may include: the distance between the line segment S1 and the line segment S2 is too large (generated according to the distance between the sub data); the distance between the line segment S2 and the line segment S3 is too small (generated according to the distance between the sub data); the difference in brightness between the line segment S1 and the line segment S2 is too small (generated according to the difference in brightness between the sub data); a damage appears in the image (irrelative to the relationship among the sub data); a line segment is broken in the image (irrelative to the relationship among the sub data); or meets the standard (does not include any of the above results). In other embodiments, the processing by the data processing apparatus 110 may also be other operations that change each sub data, such as multiplying different sub data by respective zoom-in/zoom-out ratios, or applying different filters on respective sub data.

Figure 5A:
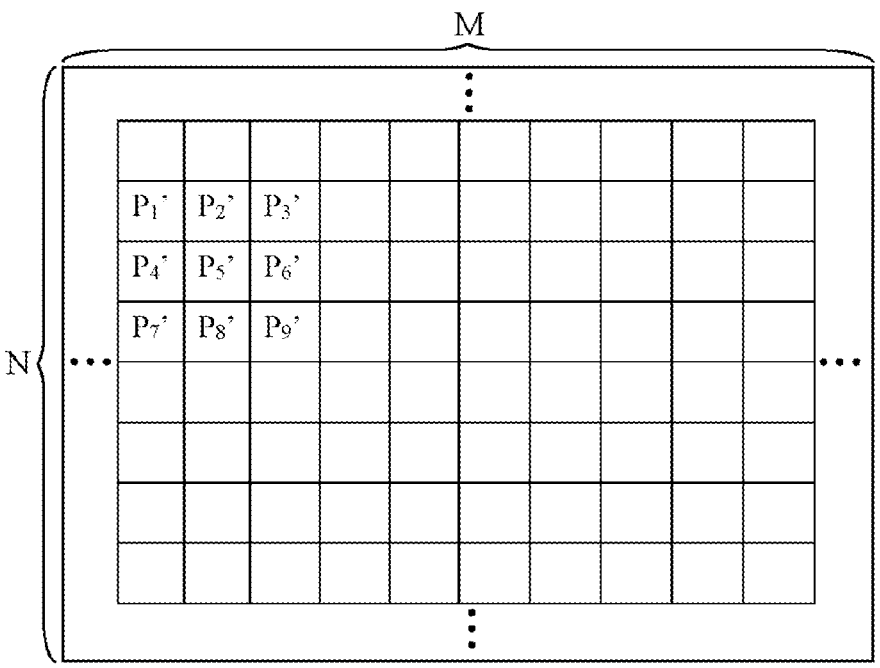
FIG. 5A is a diagram of the first adjusted sub data according to an embodiment of the present disclosure.
Figure 5B:
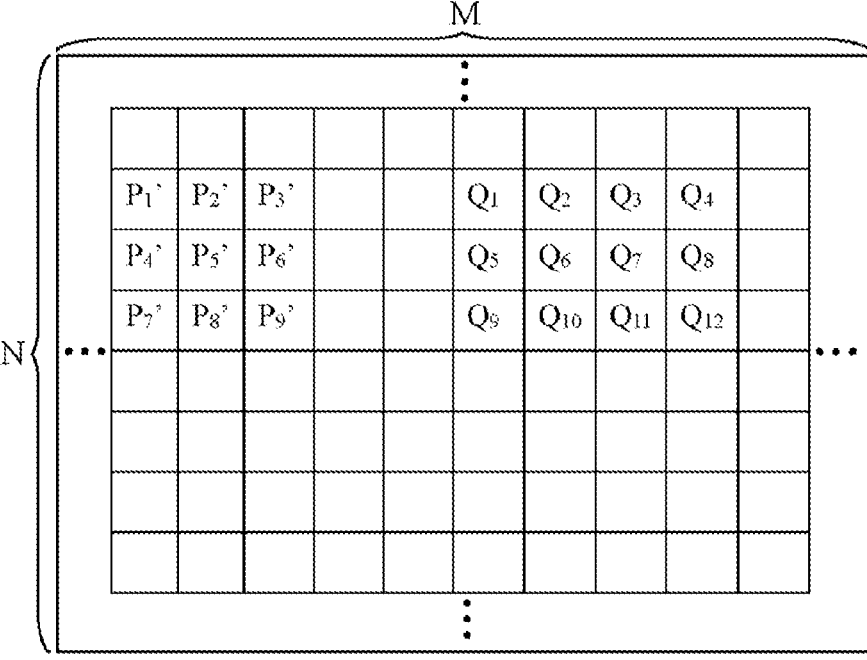
FIG. 5B is a diagram of the modified input data according to an embodiment of the present disclosure.

Generally speaking, the data processing apparatus 110 changes the relationship between the first sub data INM1 and the second sub data INM2 by adjusting the contents thereof (step S204). The first adjusted sub data INM1' and the second adjusted sub data INM2' will be combined into a new modified input data INM' by means of an "OR" operation and provided to the decision-making neural network 15 (step S206). For example, when the data processing apparatus 110 chooses to move the non-zero data of the first sub data INM1 to the left by one position so as to change the distance between the first sub data INM1 and the second sub data INM2 (i.e., changing the distance between the line segment S1 and the line segment S2), the content of the first adjusted sub data INM1' will be as shown in FIG. 5A, where values recorded originally at the positions denoted as $P_1$-$P_9$ will be moved to the left by one position and thus be recorded at the positions denoted as $P_1'$-$P_9'$, the content values beyond the range of the N*M matrix due to moving to the left are discarded, and the content values needs to be supplemented on the right side of the matrix due to moving to the left are all set to 0. In this situation, when the data processing apparatus 110 combines the first adjusted sub data INM1' with the second adjusted sub data INM2' (which is in fact not modified in this embodiment, so it is equivalent the second sub data INM2) into the modified input data INM' using OR operation, the modified input data INM' will include the content as shown in FIG. 5B, where all the values are 0 except for those at the positions denoted as $P_1'$-$P_9'$ and $Q_1$-$Q_{12}$.

After the above operations, the modified input data INM' output by the data processing apparatus 110 is a matrix of the same size of N*M as the original input data INM, so the decision-making neural network 15 may directly take the modified input data INM' as its input and generate the final result of decision according to the content of the modified input data INM'. From this, the adjustments by the data processing apparatus 110 on each sub data may affect the results of decision generated by the decision-making neural network 15. In the content of the modified input data INM', the values of all the other positions are 0 except for the positions set to 1 in the respective masks; while in the original input data INM, other positions except for the positions set to 1 in the respective masks may have non-zero values originally. That is to say, in the original input data INM, except for the respective sub data (such as INM1 and INM2) based on which the decision-making neural network 15 determines its results of decision, other positions may originally have a non-zero value; but in the modified input data INM', the values of the other positions, except for the sub data (for example, INM1' and INM2') based on which the decision-making neural network 15 determines its results of decision, are all 0. Therefore, in order to make the results of decision determined by the decision-making neural network 15 more accurate, in an embodiment, when the decision neural network 15 is trained, the data used for training may include not only a plurality of original image data, but also correspondingly a plurality of mask image data which set the pixel values of all the other positions in each original image data except for the respective sub data to 0, wherein the sub data are used by the decision-making neural network 15 for determining the results of decision. In other words, the data used to train the decision-making neural network 15 may include the above-mentioned plurality of original image data and the above-mentioned plurality of mask image data, so that decision-making neural network 15 may accurately determine the results of decision, no matter whether the input to the decision-making neural network 15 is the modified input data INM' or the original input data INM.

Still taking the packaging seals of a product as an example, suppose that the decision-making neural network 15 is originally trained to determine a proper packaging state only when the distance d1 between line segment S1 and line segment S2 is not greater than 1 mm, then once the standard is modified so that a distance d1 between the line segment S1 and the line segment S2 not greater than 2 mm may be deemed as a proper packaging, the engineer may use the data processing apparatus 110 to adjust the distance between the line segment S1 and the line segment S2 so that when the distance d1 in the image 300 is 2 mm, it may be reduced to meet the standard admitted by the decision-making neural network 15 through the processing (for example, reducing the distance between the line segment S1 and the line segment S2 by 1 mm). In other words, although the distance d1 in the image 300 is 2 mm, in the modified input data (i.e., the adjusted image) output by the data processing apparatus 110 to the decision-making neural network 15, the original distance d1 of 2 mm may be changed to 1 mm; in this way, the decision-making neural network 15 will determine that the package seal of this product meets the standard, because the distance d1 in the received image (or data) is 1 mm. In an embodiment, at the beginning, the original input data INM (for example, image 300) may be directly input to the decision-making neural network 15 first to generate a result of decision. If the result of decision is that the standard is met (for example, when the distance d1 is 0.9 mm), it is completed; if the result of decision is that the distance between the line segment S1 and the line segment S2 is too large (for example the distance d1 is 1.8 mm) and does not meet the standard, then the original input data INM is input to the system 10 with the distance between the line segment S1 and the line segment S2 adjusted by the data processing apparatus 110 (for example, the distance d1 is reduced by 1 mm to 0.8 mm) and subsequently re-enters the decision-making neural network 15 to re-generate the result of decision, so that a situation with a distance between the line segment S1 and the line segment S2 no more than 2 mm will be deemed to meet the standard. In another embodiment, if the result of decision generated by the decision-making neural network 15 is a result of other types that does not meet the standard but is irrelative to the distance between the line segments (for example, a damage on the packaging surface of the product or a broken packaging seal of the product), then the result not meeting the standard is reported directly, while the above procedure of inputting data to system 10, adjusting the distance between the line segments by the data processing apparatus 110, and then re-generating a result of decision, will not be performed. In other embodiments, the adjustment needs to be performed by the data processing apparatus 110 is determined according to the result of decision generated by the decision-making neural network 15 with the original input data INM; for example, if the result of decision is one that does not meet the standard due to an excessively long distance between the first sub data INM1 and the second sub data INM2, the data processing apparatus 110 adjusts the distance between the sub data and then inputs the modified input data to the decision-making neural network 15 to re-generate the result of decision; if the result of decision is one that does not meet the standard due to an excessively small difference in brightness between the first sub data INM1 and the second sub data INM2, the data processing apparatus 110 adjusts the difference in brightness between the sub data and then inputs the modified input data to the decision-making neural network 15 to re-generate the result of decision.

In another embodiment, when adjusting the respective sub data, the data processing apparatus 110 may perform adjustments of different degrees simultaneously to generate a plurality of different modified input data INM' respectively, and simultaneously input the plurality of different modified input data INM' into a plurality of decision-making neural networks 15, which are parallel and identical to each other, respectively, to re-generate a plurality of different results of decision, so as to reduce the necessity to manually change the degree of adjustment for re-generating the results of decision repeatedly, thereby improving the efficiency. Taking the packaging seals of products as mentioned above as an example, suppose that the decision-making neural network 15 was originally trained so that the result of decision meets the standard only when the distance d2 between the line segment S2 and the line segment S3 is not less than a minimum standard distance of 2 mm, and later it is necessary to reduce the above-mentioned minimum standard distance (for example, to 1.5 mm or 1.2 mm). In this embodiment, at the beginning, the original input data INM (for example, image 300) may be directly input to the decision-making neural network 15 to generate a result of decision; if the result of decision is one that does not meet the standard due to an excessively short distance d2 between the line segment S2 and the line segment S3, then the original input data INM is input to the system 10 and the data processing apparatus 110 simultaneously generates a plurality of different modified input data INM' which correspond to different adjusted distances between line segment S2 and line segment S3 respectively (for example, the distance d2 is increased by 0.5 mm, 1 mm, 1.5 mm, etc., respectively); the plurality of different modified input data INM' may then be respectively input to a plurality of decision-making neural networks 15, which are parallel and identical to each other, to re-generate a plurality of different results of decision; the standard will deemed as being met as long as at least one of the plurality of results of decision meets the standard. In another possible embodiment, the data processing apparatus 110 may also perform adjustments to a plurality of different degrees sequentially when adjusting the respective sub data, and the plurality of different modified input data INM' as mentioned above may also be input to one or more decision making neural networks 15 sequentially, so as to respectively generate a plurality of different results of decision sequentially.

It can be seen from the above description that the solution provided by the present disclosure can change the data that would be provided to the decision-making neural network. Before providing the input data to the decision-making neural network, this system may first divide the input data into a plurality of sub data and change the relationship among the plurality of sub data. These sub data that have their relationships with each other changed will be further input to the decision-making neural network. Thus, after the aforementioned processing, the input data provided to the decision-making neural network has changed. Since the decision-making neural network generates results based on the changed input data, as long as the parameters of the data processing apparatus are appropriately adjusted, the goal of changing the output results of the decision-making neural network may be finally achieved. Since the time required to adjust the parameters of the data processing apparatus is obviously shorter than the time required to re-train the neural network, the solution provided by the present disclosure can reduce the time cost required to use the neural network in some special environments.

Although the preferred embodiments of the present disclosure have been described above, they are not limiting. A number of variations and modifications may occur to one skilled in the art on this basis without departing from the scopes and spirits of the present disclosure. The protection scope of the present disclosure shall be subject to the scope defined by the claims of this application.

The invention claimed is:

1. A system for adjusting input data of a neural network, adapted to adjust input data prior to inference by a decision-making neural network in order to improve inference stability and robustness, the system comprising:

a feature-partitioning neural network circuit receiving multi-dimensional input data representing a plurality of features and configured to generate a plurality of sub data by partitioning the input data into feature groups based on learned feature correlation values, the plurality of sub data including at least a first sub data representing a first feature group and a second sub data representing a second feature group;

a data processing circuit coupled to the feature-partitioning neural network circuit and configured to:

apply a first transformation function to the first sub data, apply a second, different transformation function to the second sub data, wherein the first and second transformation functions apply different normalization, weighting, or scaling operations selected to modify a correlation magnitude between the first sub data and the second sub data, and combine the transformed first sub data and transformed second sub data into modified input data having an adjusted inter-feature relationship;

wherein the decision-making neural network is coupled to receive the modified input data and is configured to generate a decision output based on the adjusted inter-feature relationship, and wherein the data processing circuit modifies the inter-feature relationship prior to inference to reduce sensitivity of the decision-making neural network to noise or bias present in the original input data.

2. The system of claim 1, wherein the input data specifies image data represented as a plurality of image features.

3. The system of claim 2, wherein each of the plurality of sub data specifies a feature group corresponding to a partial image region of the image; and after the first sub data and the second sub data are processed by the data processing apparatus, a computed distance metric between a first partial image region represented by the first sub data and a second partial image region represented by the second sub data is changed.

4. The system of claim 3, wherein the decision-making neural network is configured to determine the result according to the computed distance metric between the first partial image region and the second partial image region.

5. The system of claim 1, wherein the data processing circuit is configured to modify the inter-feature relationship between the first sub data and the second sub data by different transformation magnitudes to generate a plurality of different modified input data; and wherein the plurality of different modified input data is respectively input to a plurality of decision-making neural networks to generate a plurality of different results, each decision-making neural being configured to determine a result according to the inter-feature relationship corresponding to the modified input data received by that decision-making neural network.

6. The system of claim 3, wherein a first partial image region represented by the first sub data and a second partial image region represented by the second sub data correspond to non-overlapping feature groups.

7. The system of claim 1, wherein the data-dividing neural network circuit comprises a semantic analysis neural network configured to perform feature partitioning of the input data.

8. The system of claim 1, wherein the decision-making neural network is configured to initially receive the input data to generate a first result; and wherein, in response to the first result failing to satisfy a predefined machine-evaluated standard, the data processing circuit is configured to generate the modified input data, and the decision-making neural network is configured to receive the modified input data to perform a subsequent inference operation to generate an updated result.

9. The system of claim 8, wherein the data processing circuit is configured to determine how the inter-feature relationship between the first sub data and the second sub data is to be modified based on the first result generated by the decision-making neural network.

10. A method carried out by a processor executing program code for adjusting input data of a neural network prior to inference by a decision-making neural network, the method comprising:

receiving, by a processor, multi-dimensional input data representing a plurality of features;

partitioning, using a feature-partitioning neural network, the input data into a plurality of sub data including at least a first sub data representing a first feature group and a second sub data representing a second feature group, the partitioning based on learned feature correlation values;

processing, by the processor, the first sub data using a first transformation function and the second sub data using a second transformation function different from the first transformation function, such that an inter-feature correlation between the first sub data and the second sub data is modified;

combining the processed first sub data and processed second sub data into modified input data; and inputting the modified input data to the decision-making neural network to perform an inference operation, wherein the decision-making neural network determines a result based on the modified inter-feature correlation.

11. The method of claim 10, wherein the input data specifies image data represented as a plurality of image features.

12. The method of claim 11, wherein each of the plurality of sub data comprises a feature group corresponding to a partial image region of the image; and after the first sub data and the second sub data are processed using different transformation functions, a computed distance metric between a first partial image region represented by the first sub data and a second partial image region represented by the second sub data is changed.

13. The method of claim 12, wherein the decision-making neural network determines the result based on the computed distance metric between the first partial image region and the second partial image region.

14. The method of claim 10, wherein processing the first sub data and the second sub data using different transformation functions comprises:

modifying an inter-feature relationship between the first sub data and the second sub data by different transformation magnitudes to generate a plurality of different modified input data, respectively;

inputting the plurality of different modified input data respectively to a plurality of decision-making neural networks to generate a plurality of different results, each decision-making neural network determining a result according to the inter-feature relationship corresponding to the modified input data received by that decision-making neural network.

15. The method of claim 12, wherein a first partial image region represented by the first sub data and a second partial image region represented by the second sub data correspond to non-overlapping feature groups.

16. The method of claim 10, wherein dividing the input data into a plurality of sub data comprises using a semantic analysis neural network configured to perform feature partitioning to generate the plurality of sub data.

17. The method of claim 10, wherein before processing the first sub data and the second sub data using different transformation functions, the method further comprises:

inputting the input data to the decision-making neural network to perform an initial inference operation and generate a first result; and in response to the first result failing to satisfy a predefined machine-evaluated standard, processing the first sub data and the second sub data using the different transformation functions to generate the modified input data and performing a subsequent inference operation using the modified input data.

18. The method of claim 17, further comprising: determining how an inter-feature relationship between the first sub data and the second sub data is to be modified based on the first result generated by the decision-making neural network.

* * * * *